United States Patent
Pudenz

(10) Patent No.: US 8,172,333 B2
(45) Date of Patent: May 8, 2012

(54) AIR-CONDITIONED VEHICLE SEAT

(75) Inventor: Christian Pudenz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 509 days.

(21) Appl. No.: 12/420,357

(22) Filed: Apr. 8, 2009

(65) Prior Publication Data

US 2009/0253363 A1 Oct. 8, 2009

Related U.S. Application Data

(63) Continuation of application No. PCT/EP2007/007608, filed on Aug. 31, 2007.

(30) Foreign Application Priority Data

Oct. 11, 2006 (DE) .......... 10 2006 048 048

(51) Int. Cl.
*A47C 7/02* (2006.01)
(52) U.S. Cl. .............. 297/452.42; 297/452.46
(58) Field of Classification Search .......... 297/452.42, 297/452.43, 452.46, 452.47
See application file for complete search history.

(56) References Cited

U.S. PATENT DOCUMENTS

| | | | |
|---|---|---|---|
| 6,206,465 B1 * | 3/2001 | Faust et al. | 297/180.14 |
| 6,619,737 B2 * | 9/2003 | Kunkel et al. | 297/180.14 |
| 6,817,675 B2 * | 11/2004 | Buss et al. | 297/452.6 |
| 2002/0003362 A1 | 1/2002 | Kunkel et al. | |
| 2002/0067064 A1 * | 6/2002 | Jaillet et al. | 297/452.27 |
| 2003/0230913 A1 | 12/2003 | Buss et al. | |
| 2006/0038432 A1 | 2/2006 | Koehler | |
| 2007/0040421 A1 | 2/2007 | Zuzga et al. | |
| 2007/0244396 A1 | 10/2007 | Vilser et al. | |

FOREIGN PATENT DOCUMENTS

| | | |
|---|---|---|
| DE | 100 24 879 C1 | 10/2001 |
| DE | 101 56 658 C1 | 5/2003 |
| DE | 10 2004 039 058 A1 | 2/2006 |
| DE | 10 2006 023 129 A1 | 3/2007 |
| DE | 10 2006 018 445 A1 | 10/2007 |
| EP | 1 364 827 B1 | 11/2003 |
| EP | 1 365 827 A2 | 12/2003 |
| EP | 1 519 854 B1 | 5/2006 |
| WO | WO 02/068032 A2 | 9/2002 |

OTHER PUBLICATIONS

International Search Report dated Nov. 27, 2007 w/English translation (four (4) pages).
German Search Report dated Jan. 30, 2007 w/English translation of pertinent portion (nine (9) pages).

* cited by examiner

*Primary Examiner* — Sarah B McPartlin
(74) *Attorney, Agent, or Firm* — Crowell & Moring LLP

(57) ABSTRACT

An air-conditioned vehicle seat is provided having an air impermeable lower upholstered seat or backrest part, an intermediate layer through which air flows, and an upholstery cover through which air flows on the side of the intermediate layer. By way of stitches anchored on the upholstered part, the upholstery cover is divided into mutually delimited upholstery zones, air bridges extending between the individual upholstery zones transversely to the seams provided for connecting the intermediate layer. An unhindered seat ventilation and a durably secure fixing of the stitches is achieved in a simple manner with respect to manufacturing and without impairing the sitting comfort, in that, in the longitudinal direction of the seams, the air bridges have a construction that is narrower than that of the seam-side edge zones of the intermediate layer, and the stitches are anchored without the insertion of air bridges on the wall sections of the upholstered part adjoining the air bridges on both sides.

17 Claims, 2 Drawing Sheets

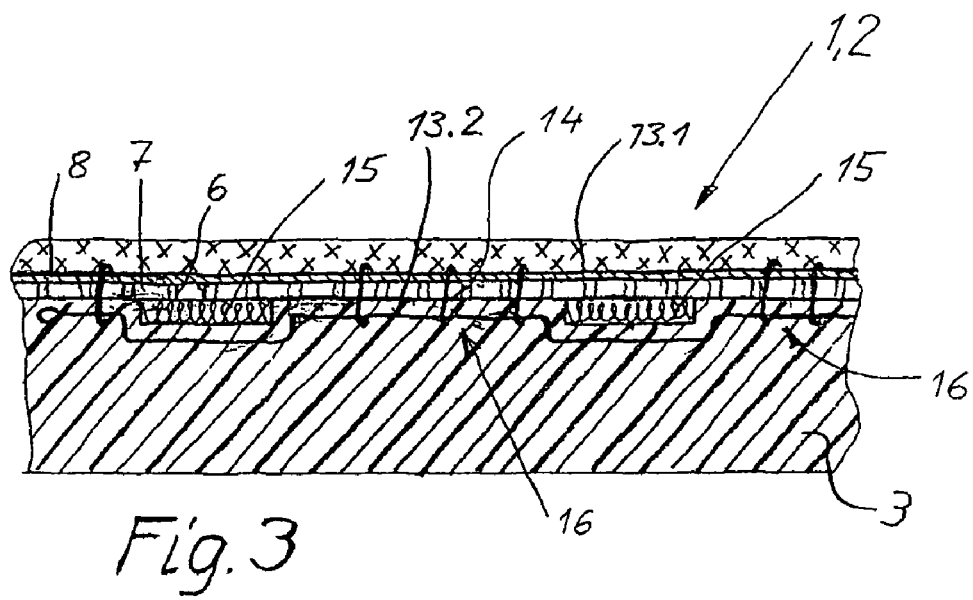
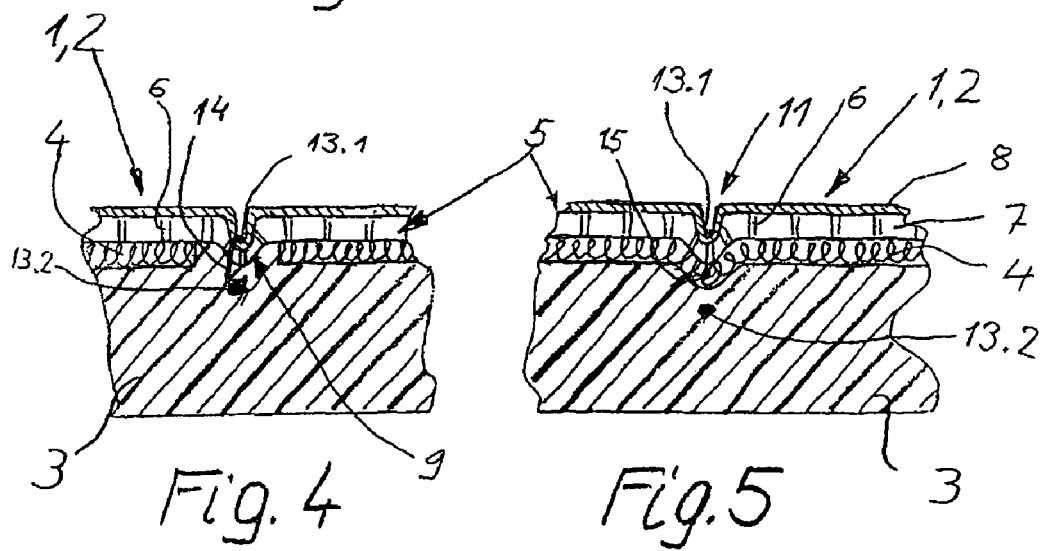

AIR-CONDITIONED VEHICLE SEAT

CROSS-REFERENCE TO RELATED APPLICATIONS

This application is a continuation of PCT International Application No. PCT/EP2007/007608, filed Aug. 31, 2007, which claims priority under 35 U.S.C. §119 to German Patent Application No. DE 10 2006 048 048.1, filed Oct. 11, 2006, the entire disclosures of which are herein expressly incorporated by reference.

This application contains subject matter related to U.S. application Ser. No. 12/417,039, entitled "Actively Ventilated Vehicle Seat," filed on Apr. 2, 2009, now U.S. Pat. No. 8,038,222, which issued on Oct. 18, 2011.

BACKGROUND AND SUMMARY OF THE INVENTION

The invention relates to an air-conditioned vehicle seat having a lower air impermeable upholstered seat or backrest part, an intermediate layer arranged on the latter, through which air flows, and an upholstery cover, which is divided by way of quilted seams into mutually delimited upholstered zones and through which air flows on the side of the intermediate layer.

In the case of an air-conditioned vehicle seat of the type known from German patent document DE 100 24 879 C1, the seams are constructed as stitch seams in the upholstery cover, through which air flows and which consists of a flexible-foam layer and the fabric cover. In this case, the drawing-in depth of the stitchings is limited to the thickness of the upholstery cover and, in addition, a load-resistant anchoring of the stitches on the lower upholstered part is absent.

Furthermore, an actively ventilated motor vehicle seat is known from European patent document EP 1 364 827 B1, where the upholstery cover is fastened by way of the intermediate layer, through which the air flows, in such a manner to the lower upholstered part that, distributed in the longitudinal direction of the seams, studs are screwed to the lower upholstered part and extend through the intermediate layer and are detachably hooked together with quilting rods pulled into the upholstery cover. Although, as a result, major constrictions of the air-guiding intermediate layer are avoided in the area of the seams, the sitting comfort is considerably impaired by the studs projecting upward beyond the intermediate layer.

Finally, in the case of the vehicle seat of the above-mentioned type known from German patent document DE 101 56 658 C1, in the case of which the intermediate layer, through which the air flows, is divided along the seams into individual sections, which are separated from one another with respect to ventilation, insertion strips in the form of spacing textures are arranged in a sunk manner in the lower upholstered part and extend in conformance with the length of the seams below the seam-side edge sections of the intermediate layer sections and act as air bridges between the latter. The seams are produced by pull wires, which extend through the insertion strips and are anchored in the lower upholstered part. The production and arrangement of the air-bridge-forming insertion strips requires increased manufacturing expenditures and, since the insertion strips are compressed in a manner narrowing their cross-section by the active pulling forces of the quilting wires, the air exchange between the individual sections of the intermediate layer may be impaired.

It is an object of the invention to achieve an unhindered seat ventilation and a durably secure fixing of the seam stitches in a manner that is simple with respect to the manufacturing and does not impair the sitting comfort in the case of an air conditioned vehicle seat.

According to the invention, air bridges having relatively small dimensions are set in the upholstered part in a sunk manner on both sides along the longitudinal direction of the seams. The stitches are anchored to the wall sections of the upholstered part laterally directly adjoining the air bridges, so that the air bridges are largely relieved from the tension forces resulting from the stitches. As a result, a durably pull- and slide-resistant fastening of the upholstery cover along the seams is ensured. This leads to an unhindered air flow through the intermediate layer on the path via the air bridges, while the sitting comfort is simultaneously high in connection with a seat construction that is simple with respect to its manufacturing and remains stable for a long time.

In a further development of the invention preferred with respect to the manufacturing, the air bridges and the intermediate layer are prefabricated as a one-piece insert, specifically normally consisting of a spacing texture.

The cross-sectional width of the air bridges, which is smaller compared to the intermediate layer, can be compensated by a cross-sectional height enlarged with respect to the latter, and/or can preferably be compensated by a specific air permeability of the air bridges that is higher compared to the intermediate layer.

In order to be able to anchor the stitches along a length that is as large as possible directly on the upholstered part, the wall sections of the upholstered part adjoining the air bridges are dimensioned in the longitudinal direction of the seams preferably at least as wide as the air bridges, and a particularly large pull-in depth of the upholstery cover can be achieved in that the stitches are fitted into a pull-in duct of the upholstered part, and the air passages are arranged on both sides flush with the pull-in duct and sunk in the upholstered part.

With a view to a particularly secure fastening of the stitches on the upholstered part, it is recommended to anchor these stitches on a quilting element continuously extending in the upholstered part along the seams, which quilting element, for reasons of a uniformly stable embedding in the material of the upholstered part, preferably extends at a uniform depth below the air bridges as well as in the wall sections of the upholstered part free of air bridges.

For relieving the air bridges from the tension forces resulting from the stitches, the anchoring of the stitches is particularly preferably limited to the wall sections of the upholstered part which are free of air bridges.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a very schematic sectional view along one of the seams of the vehicle seat shown in FIG. 1;

FIG. 4 is a very schematic sectional view transversely to one of the seams of the vehicle seat shown in FIG. 1 taken along Line I of FIG. 1; and FIG. 5 is a very schematic sectional view transversely to one of the seams of the vehicle seat shown in FIG. 1 taken along Line II of FIG. 1.

DETAILED DESCRIPTION OF THE DRAWINGS

Figure 1:
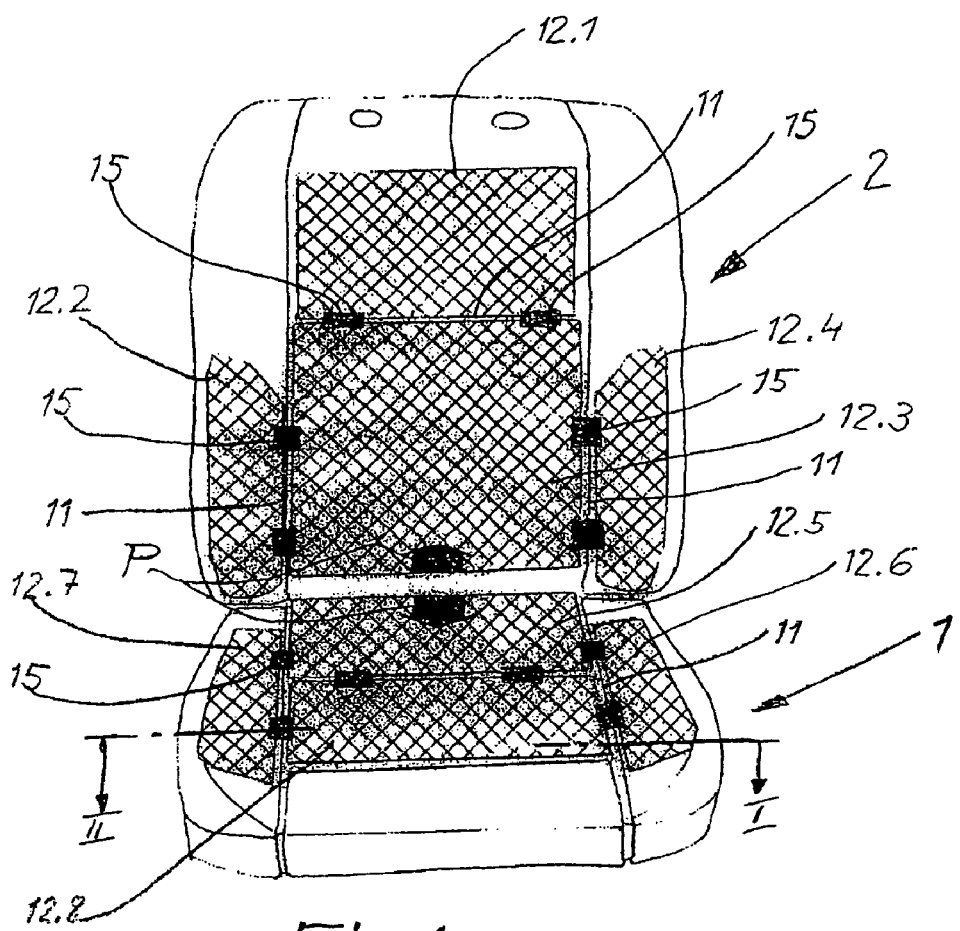
FIG. 1 is a very schematic perspective view of an air-conditioned vehicle seat according to the invention having a spacing texture in the cross-hatched surface areas, air flowing through this spacing texture.

The actively ventilated (air-conditioned) vehicle seat illustrated in the figures consists of a seat module and a backrest module 1, 2, which each contain an air impermeable upholstered part 3 of a foamed material, an intermediate layer 4 of a wide-meshed spacing texture which covers the upholstered part 3 in the cross-hatched surface areas and through which air flows, as well as an upholstery cover through which air flows on the intermediate-layer side and which, as a whole, has the reference number 5. The upholstery cover 5 has a foamed-material padding 7 penetrated by air openings 6 and a cover material 8 stretching over the foamed-material padding 7.

The air supply to the spacing texture 4 of the seat module and of the backrest module 1, 2, respectively takes place, for example, at the air inlet points indicated by arrows P in FIG. 1 by way of—not shown—mini-fans in an air shaft 10 of the upholstered part 3.

For the securing of the upholstery cover 5, transversely and longitudinally extending seams 11 are provided on the seat module and on the backrest module 1, 2, which seams 11 divide the upholstery cover 5 into individual, mutually delimited upholstery zones 12.1 . . . 12.8 and, in each case, have a stitch wire 13.1 which runs through on the side of the upholstery cover 5 and which is braced under tension by way of tension-proof stitch clamps 14. The stitch clamps 14, however, are flexible in the pressure direction. Another stitch wire 13.2 is continuously embedded in the upholstered part 3. For increasing the pull-in depth, the seams 11 are arranged in a pull-in duct 9 of the upholstered part 3 (FIG. 4).

Figure 2:
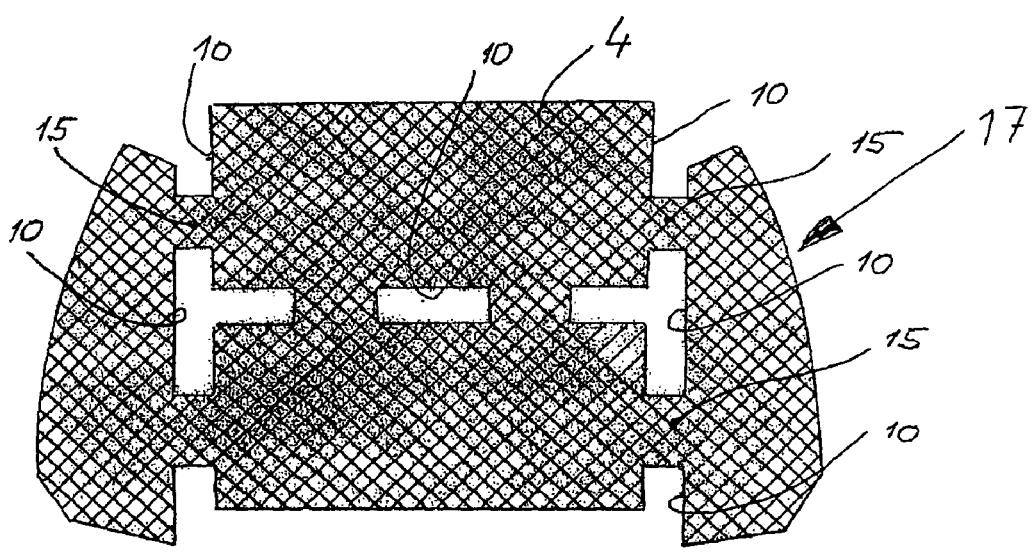
FIG. 2 is a very schematic top view of a texture blank which, including the air bridges, is in one piece.

The surface sections of the intermediate layer 4 situated in the individual upholstery zones 12 are in air communication with one another via air bridges 15 (shown in a blackened manner in FIG. 1) extending transversely below the seams 11. As illustrated in FIGS. 2 and 3, the width of the air bridges 15 in the longitudinal direction of the seams 11 is significantly smaller than the length of the seam-side edge zones 10 of the intermediate layer 4 (FIG. 2) and of the wall sections 16 of the upholstered part 3 (FIG. 3) adjoining on both sides, which are free of air bridges. Between the wall sections 16, the upholstered part 3 is provided with recesses, in which the air bridges 15 are arranged in a sunk manner such that they follow the adjoining pull-in ducts 9 in an essentially flush fashion.

As illustrated in FIG. 3, the seam wire 13.2 extends continuously at a uniform depth in the upholstered part 3 below the air bridges 15 as well as along the wall sections 16. The anchoring of the stitches 11 are delimited by way of the seam clamps 14 to the wall sections 16 of the upholstered part 3, so that the stitch forces are essentially absorbed by the wall sections 16, which are free of air bridges, and are largely kept away from the air bridges 15. As a result, a highly stable anchoring of the stitches 11 directly on the upholstered part 3 is achieved without any stressing of the air bridges 15 by the stitch forces in a cross-section-narrowing manner.

For producing a seat module or backrest module 1 and 2 respectively, a one-piece texture blank consisting of a spacing texture is produced first; for example, the texture blank 17 according to FIG. 2 for the seat module 1 which, including the air bridges 15, includes the sections of the intermediate layer 4 corresponding to the individual upholstery zones 12.5 . . . 12.8 of the seat module 1. Subsequently, the blank 17 is placed on the upholstered part 3 prefabricated while embedding the stitch wire 13.2, so that the air bridges 15 are accommodated between the turned-up wall sections 16 of the upholstered part 3 flush with the pull-in ducts 9, whereupon the seat module or backrest module 1, 2 is completed by the mounting of the upholstery cover 5 and the bracing of the stitches 11.

For compensating the cross-sectional width of the air bridges 15, which is smaller in comparison with the intermediate layer 4, these air bridges 15 can also be fabricated separately from the intermediate layer 4 and be made of a different spacing texture or a lower specific flow resistance than the intermediate layer 4.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air-conditioned vehicle seat, comprising:
    an air impermeable lower upholstered seat or backrest part;
    an intermediate layer through which air flows;
    an upholstery cover through which air flows from a side of the intermediate layer, the upholstery cover, via seams anchored on the air impermeable upholstered part, is divided into mutually delimited individual upholstery zones; and
    air bridges extending between the individual upholstery zones transversely to the seams, the air bridges fluidically connecting respective portions of the intermediate layer corresponding to the individual upholstery zones;
    wherein in a longitudinal direction of the seams, the air bridges have a construction that is narrower than that of seam-side edge zones of the intermediate layer, and further wherein seam stitches are anchored with stitch forces to wall sections of the upholstered part that are laterally adjacent the air bridges substantially without the stitch forces stressing the air bridges.

2. The vehicle seat according to claim 1, wherein the air bridges and the intermediate layer are prefabricated as a one-piece insert.

3. The vehicle seat according to claim 2, wherein the upholstery cover is stitched in a pull-in duct of the upholstered part, and further wherein the air bridges are arranged on both sides flush with the pull-in duct in a sunk manner in the upholstered part.

4. The vehicle seat according to claim 2, wherein the seam stitches are anchored on quilting elements which are enclosed in the air impermeable material of the upholstered part and extend continuously along the seams.

5. The vehicle seat according to claim 4, wherein stitch elements are profiled such that they extend at a uniform depth in the material of the upholstered part below the air bridges as well as in the wall sections of the upholstered part that are free of air bridges.

6. The vehicle seat according to claim 2, wherein the intermediate layer and the air bridges comprise a spacing texture.

7. The vehicle seat according to claim 1, wherein the air bridges have a higher specific air permeability than the intermediate layer.

8. The vehicle seat according to claim 7, wherein the wall sections of the upholstered part adjoining the air bridges are dimensioned to be at least as wide as the air bridges in the longitudinal direction of the seams.

9. The vehicle seat according to claim 1, wherein the wall sections of the upholstered part adjoining the air bridges are dimensioned to be at least as wide as the air bridges in the longitudinal direction of the seams.

10. The vehicle seat according to claim 9, wherein the upholstery cover is stitched in a pull-in duct of the upholstered part, and further wherein the air bridges are arranged on both sides flush with the pull-in duct in a sunk manner in the upholstered part.

11. The vehicle seat according to claim 4, wherein the seam stitches are anchored on quilting elements which are enclosed in the air impermeable material of the upholstered part and extend continuously along the seams.

12. The vehicle seat according to claim 1, wherein the upholstery cover is stitched in a pull-in duct of the upholstered part, and further wherein the air bridges are arranged on both sides flush with the pull-in duct in a sunk manner in the upholstered part.

13. The vehicle seat according to claim 12, wherein the seam stitches are anchored on quilting elements which are enclosed in the air impermeable material of the upholstered part and extend continuously along the seams.

14. The vehicle seat according to claim 1, wherein the seam stitches are anchored on quilting elements which are enclosed in the air impermeable material of the upholstered part and extend continuously along the seams.

15. The vehicle seat according to claim 14, wherein stitch elements are profiled such that they extend at a uniform depth in the material of the upholstered part below the air bridges as well as in the wall sections of the upholstered part that are free of air bridges.

16. The vehicle seat according to claim 1, wherein the anchoring of the seam stitches is limited to the wall sections of the upholstered part which are free of air bridges.

17. The vehicle seat according to claim 1, wherein the intermediate layer and the air bridges comprise a spacing texture.

* * * * *